United States Patent
Washington et al.

(10) Patent No.: US 7,536,978 B2
(45) Date of Patent: *May 26, 2009

(54) TREAT DISPENSING DEVICE

(76) Inventors: Tabitha Antoinette Washington, P.O. Box 421, Norwich, VT (US) 05055; Leon Michael Jones, P.O. Box 421, Norwich, VT (US) 05055

( * ) Notice: Subject to any disclaimer, the term of this patent is extended or adjusted under 35 U.S.C. 154(b) by 317 days.

This patent is subject to a terminal disclaimer.

(21) Appl. No.: 11/156,133

(22) Filed: Jun. 17, 2005

(65) Prior Publication Data

US 2006/0060153 A1    Mar. 23, 2006

Related U.S. Application Data

(60) Provisional application No. 60/610,883, filed on Sep. 20, 2004.

(51) Int. Cl.
    *A01K 29/00*    (2006.01)
(52) U.S. Cl. .................... 119/707; 119/51.01
(58) Field of Classification Search ............. 119/51.01, 119/707; 222/192, 196.1; 221/200, 202
    See application file for complete search history.

(56) References Cited

U.S. PATENT DOCUMENTS

| | | | |
|---|---|---|---|
| 5,191,856 A | 3/1993 | Gordon | 119/29.5 |
| 5,213,232 A | 5/1993 | Kraft et al. | 221/277 |
| 5,390,629 A | 2/1995 | Simone | 119/711 |
| 5,553,570 A | 9/1996 | VanNatter, III et al. | 119/709 |
| 5,758,604 A | 6/1998 | Jorgensen | 119/711 |
| 5,813,366 A | 9/1998 | Madldin, Jr. | 119/710 |
| 5,819,690 A | 10/1998 | Brown | 119/707 |
| 5,832,877 A | 11/1998 | Markham | 119/707 |
| 5,865,147 A | 2/1999 | Rubin | 119/711 |
| 5,947,061 A | 9/1999 | Marrkham et al. | 119/710 |
| 5,947,790 A * | 9/1999 | Gordon | 446/247 |
| 5,957,082 A | 9/1999 | Budman et al. | 119/54 |
| 6,073,581 A | 6/2000 | Wang | 119/51.01 |
| 6,098,571 A | 8/2000 | Axelrod et al. | 119/707 |
| 6,158,391 A * | 12/2000 | Simonetti | 119/707 |
| 6,237,538 B1 | 5/2001 | Tsengas | 119/707 |
| 6,484,671 B2 | 11/2002 | Herrenbruck | 119/707 |
| 6,557,496 B2 | 5/2003 | Herrenbruck | 119/707 |
| 6,688,258 B1 | 2/2004 | Kolesar | 119/710 |

* cited by examiner

*Primary Examiner*—T. Nguyen
(74) *Attorney, Agent, or Firm*—Walter J. Teneza, Jr.

(57) ABSTRACT

An apparatus for dispensing pet food items comprising a cap and a body portion is provided. The body portion includes a first cylindrical section connected to a second cylindrical section by a transitional section. When the cap is attached to the first cylindrical section a chamber is formed inside of a combination of the cap, the first cylindrical section, the transitional section, the second cylindrical section, and the end piece, so that the only exit from the chamber is through an opening in the second cylindrical section. A plurality of pet treats or food items may be located inside of the body portion.

8 Claims, 5 Drawing Sheets

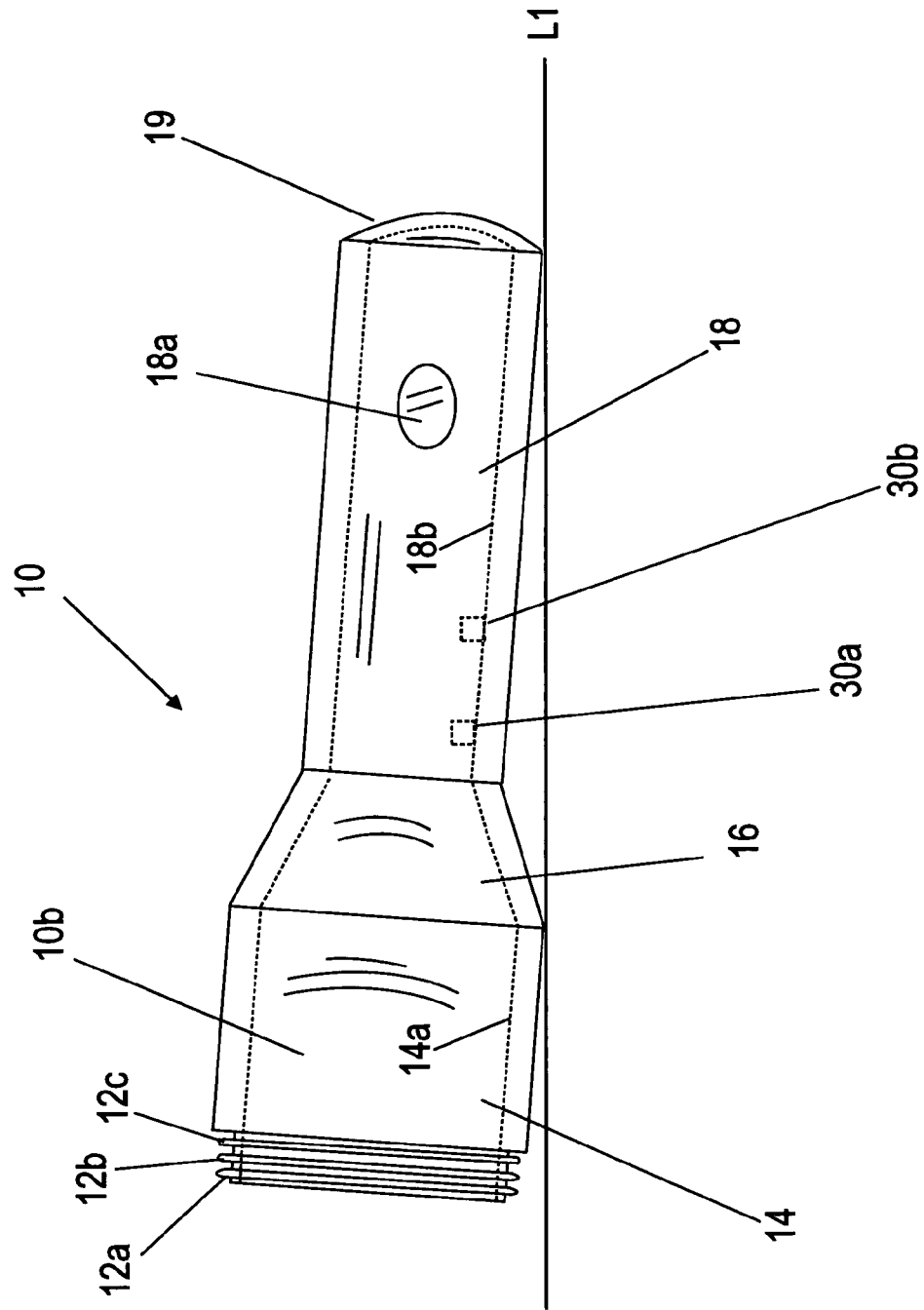

TREAT DISPENSING DEVICE

CROSS REFERENCE TO RELATED APPLICATION(S)

This application claims the priority of provisional patent application Ser. No. 60/610,883, filed on Sep. 20, 2004, titled "TreatStik", inventor(s) and applicant(s) Tabitha Antoinette Washington and Leon Michael Jones.

FIELD OF THE INVENTION

This invention relates to improved methods and apparatus concerning devices for dispensing treats, such as food, to pets.

BACKGROUND OF THE INVENTION

Pet toys on the market reveal a variety of devices for playing with animals and for teaching them various behaviors; including such things as chewable toys, plastic bones and artificial animals. In addition, artificial mice, rubber and plastic balls, rattles, bells and stuffed articles, such as balls and bags stuffed with cloth and catnip are some of the types of conventional pet toys currently in use. Cats, dogs and other pets can play with these toys by swatting, pushing and carrying them about.

SUMMARY OF THE INVENTION

The present invention in one or more embodiments provides an apparatus for dispensing pet food items comprising a cap and a body portion. The body portion is comprised of a first cylindrical section having a first inner diameter, and a second clindrical section having a second inner diameter which is less than the first inner diameter. The body portion is also comprised of a transitional section having a gradually decreasing inner diameter wherein the gradually decreasing inner diameter of the transitional section gradually decreases from the first inner diameter to the second inner diameter. The transitional section typically connects the first cylindrical section with the second cylindrical section. The cap and the first cylindrical section are adapted so that the cap can be attached to or detached from the first cylindrical section.

The second cylindrical section may include a first end which is connected to the transitional section and a second end which is closed off by an end piece. The second cylindrical section may include a periphery through which is located an opening. When the cap is attached to the first cylindrical section a chamber is formed inside of a combination of the cap, the first cylindrical section, the transitional section, the second cylindrical section, and the end piece, so that the only exit from the chamber is through the opening. A plurality of treats may be located inside of the body portion.

The first cylindrical section may have a first outer diameter. The second cylindrical section may have a second outer diameter which is less than the first outer diameter. The transitional section may have a gradually decreasing outer diameter which gradually decreases from the first outer diameter to the second outer diameter. The first cylindrical section may have a first thickness which is the difference between the first outer diameter and the first inner diameter. The second cylindrical section may have a second thickness which is the difference between the second outer diameter and the second inner diameter. The transitional section may have a third thickness which is the difference between the third outer diameter and the third inner diameter; The first, second, and third thicknesses may be equal.

The first cylindrical section may have a first inner surface. The second cylindrical section may have a second inner surface. When the cap is attached to the body portion and the apparatus is placed on a flat surface, the first inner surface and the second inner surface typically slant downwards towards the flat surface. The apparatus may be made of hard plastic.

BRIEF DESCRIPTION OF THE DRAWINGS

FIG. 5 shows a side view of the body portion of FIG. 4, wherein the body portion is laid on a flat surface.

DETAILED DESCRIPTION OF THE DRAWINGS

Figure 1:
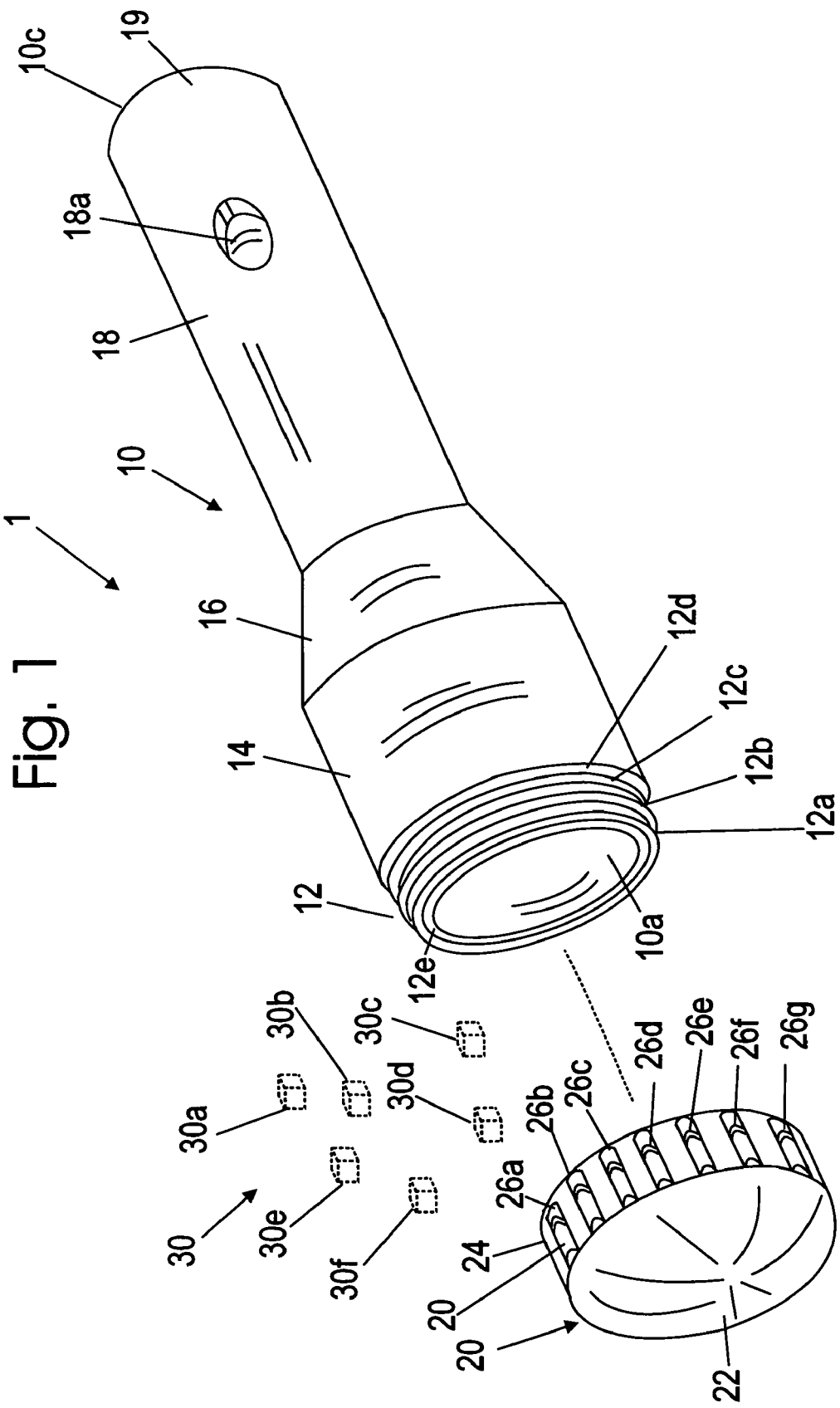
FIG. 1 shows a perspective view of an apparatus in accordance with an embodiment of the present invention along with a plurality of treats or items of food, wherein the apparatus is shown taken apart.

FIG. 1 shows a perspective view of an apparatus 1 in accordance with an embodiment of the present invention along with a plurality of treats or items of food 30, wherein the apparatus 1 is shown taken apart. The apparatus 1 includes body portion 10 and cap 20.

The body portion 10 includes sections 12, 14, 16, 18, and 19. Section 12 is a hollow cylinder having outer threads, such as outer threads 12a, 12b, and 12c. Section 12 may have a smooth inner surface and a large circular opening 10a into which treats or items of food 30 can be placed. Section 12 is connected to or intergrated with section 14. Section 14 may be a hollow cylinder having a smooth outer surface and a smooth inner surface. Section 14 is connected to or integrated with section 16. Section 16 may have an outer diameter which gradually decreases from being equal to the outer diameter of section 14 to being equal to the outer diameter of section 18.

Section 16 is connected to or integrated with section 18. Section 18 is a hollow cylinder having a smooth outer surface and a smooth inner surface. Section 18 is connected to or integrated with section 19. Section 19 may be a domed portion which closes the section 18 at one end. Section 18 may have an opening 18a which leads into the chamber 10b inside of the body portion 10. The opening 18a may be circular or elliptical.

Figure 3:
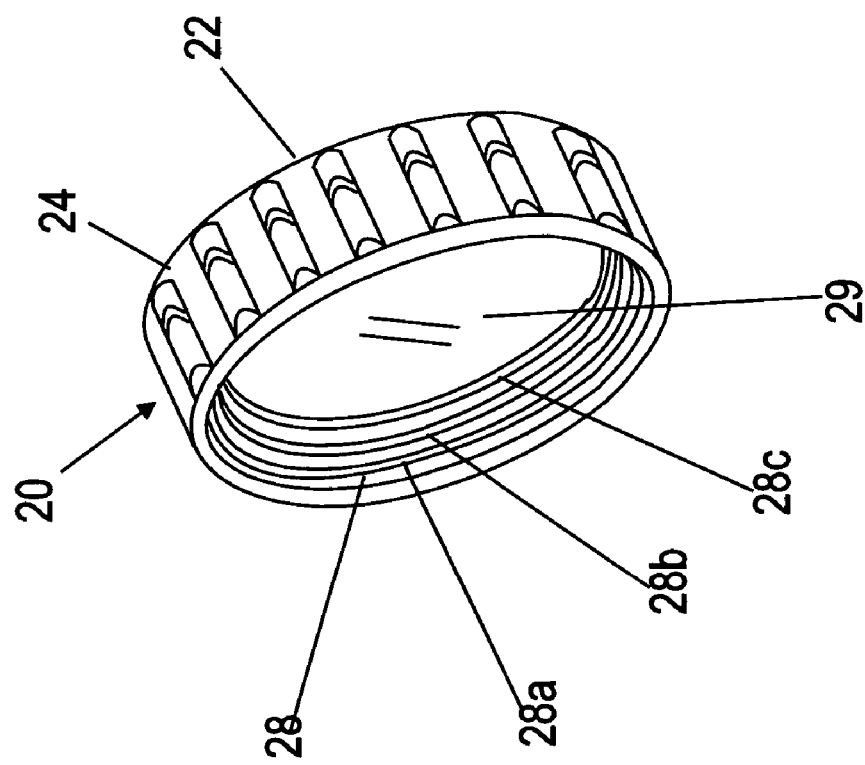
FIG. 3 shows a perspective view of a cap which is part of the apparatus of FIG. 1.

The cap 20 may include a domed portion 22 connected to or integrated with a peripheral wall 24. The peripheral wall 24 may have a plurality of ridges 26, including ridges 26a-26g, attached thereto. There would typically be ridges, equally spaced, going all the way around the peripheral wall 24. The ridges make it easier for an individual to grip and turn the cap 20 to screw the cap 20 onto the section 12 or to unscrew the cap 20 off of the section 12. FIG. 3 shows a perspective view of the cap 20 which is part of the apparatus 1 of FIG. 1. FIG. 3 shows an inner surface 29 of the cap 20. FIG. 3 also shows inner threads 28, which include threads 28a, 28b, 28c, and 28d.

Figure 2:
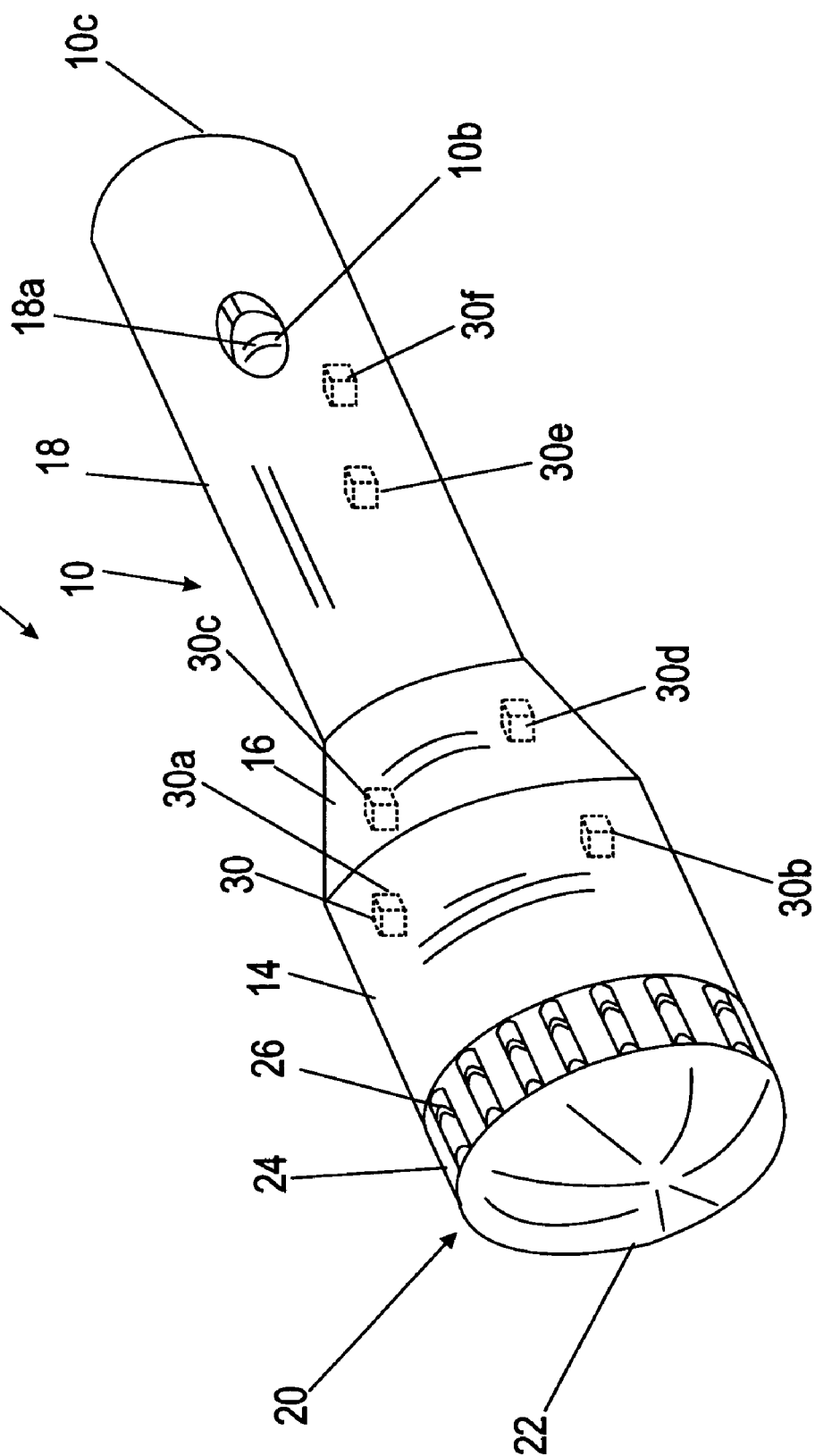
FIG. 2 shows a perspective view of the apparatus of FIG. 1, with the apparatus shown in an assembled form, and with the plurality of treats shown in dashed lines inside of the assembled apparatus.

FIG. 2 shows a perspective view of the apparatus 1 of FIG. 1, with the apparatus 1 shown in an assembled form, and with the plurality of treats 30 shown in dashed lines inside of the assembled apparatus 1. In FIG. 2, the inner threads 28 of the cap 20 have been screwed onto the outer threads 12a, 12b, and 12c, of the section 12. The apparatus 1 is completely closed with the exception of the opening 18a. The treats 30 lie in the cavity or chamber 10b inside of the apparatus 1. A pet, such as a dog, can push, pull, shake, or otherwise move the assembled apparatus 1, and thereby cause one or more treats 30 to fall out of the opening 18a.

Figure 4:
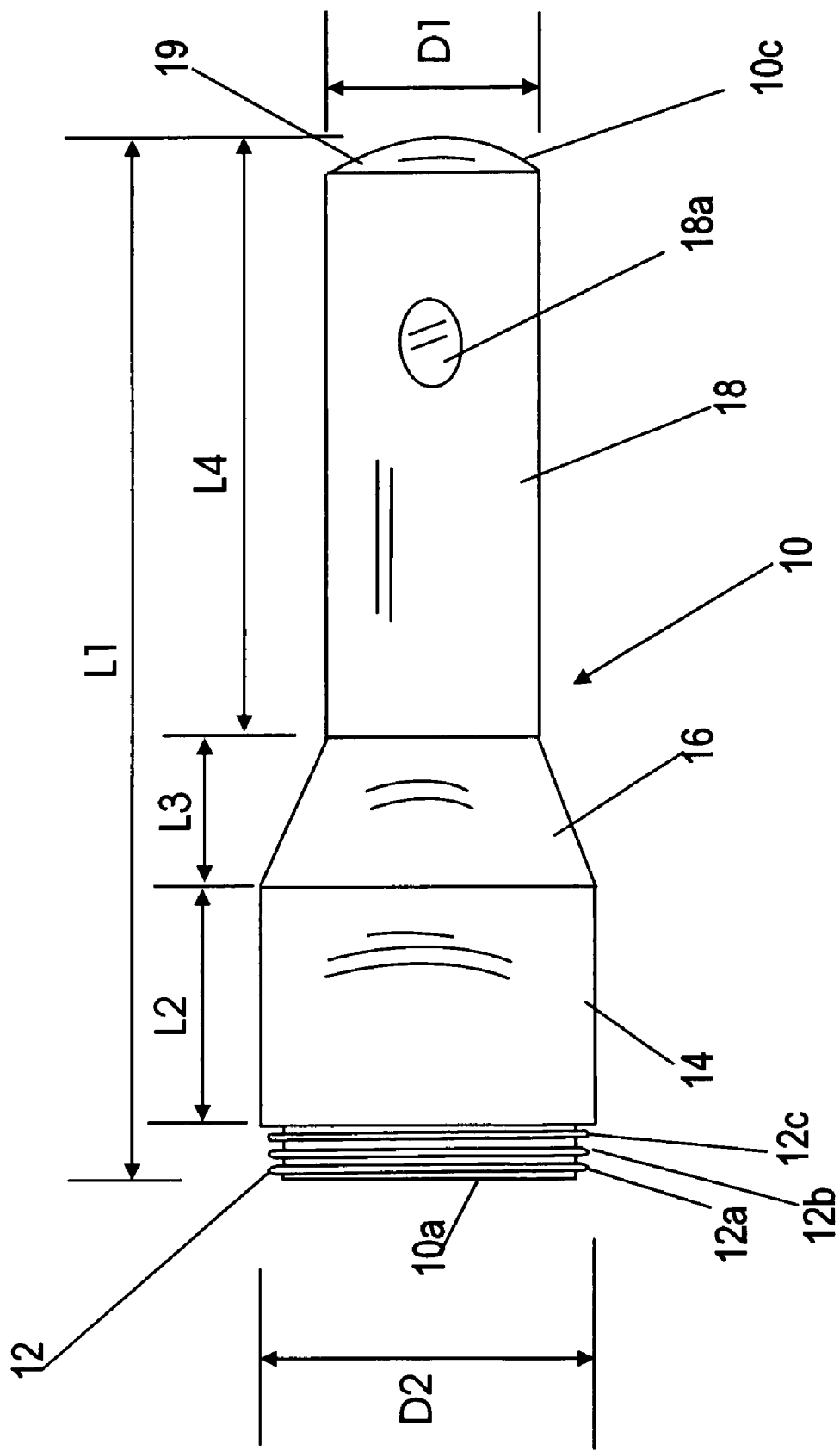
FIG. 4 shows a side view of a body portion of the apparatus of FIG. 1.

FIG. 4 shows a side view of the body portion 10 of the apparatus 1 of FIG. 1. The body portion 10 may have a length L1, which may be eight and three quarters inches. The section 14 may have a length L2, which may be one and three quarters inches. The section 16 may have a length L3, which may be one inch. The combination of the section 18 and the section 19 may have a length L4, which may be six inches. The section 14 may have an outer diameter of D2, which may be three inches. The section 18 may have an outer diameter of D1, which may be two inches. The body portion has a closed end 10c. The section 14 has an edge 12d shown in FIG. 1 where section 14 joins with section 12. The opening 18a should be large enough to allow any one of the treats or items of food 30 to escape through the opening 18a. The opening 18a may be an ellipse having a first or Y-axis diameter of 0.26 inches and a second, X-axis diameter, perpendicular to the Y-axis diameter, of 0.375 inches.

FIG. 5 shows a side view of the body portion 10 of FIG. 4, wherein the body portion 10 is laid on a flat surface L1. FIG. 5 also shows dashed lines which show the thickness of the walls of the different sections and the chamber 10b inside of the body portion 10. Section 14, section 16, and section 18 may each have the same thickness. When the body portion 10 is on a flat surface L1, an inner surface 14a of section 14 is slanted down in the direction of opening 18a. Similarly, an inner surface 18b of section 18 is slanted down towards the direction of opening 18a. The section 12 may have a thickness which is somewhat thinner than the other sections, to allow for outer threads 12a, 12b, and 12c.

Various sizes and shapes of pet treats or pet food items can be used instead of items 30. The oval or elliptical opening 18a is sized to allow for the random and slow dispersement of treats or food items, such as items 30. Treats can be inserted into the opening 10a and into the chamber 10b, when the cap 20 is not connected to the body portion 10.

The body portion 10 and the cap 20 may be made of a durable and non-toxic material so that it can resist animal chewing and will not cause the animal to become ill. The body portion 10 and the cap 20 may be made of a hard plastic which doesn't chip when bitten by an animal.

Various materials have been found suitable for the manufacture of the apparatus 1 including thermoplastic and thermoset plastic materials, as well as elastomeric type materials. In a particularly preferred embodiment, the device is manufactured from a durable material of increased thickness as to resist the animal chewing it apart. For example, the thickness of each of the sections 14, 16, 18, and 19, as shown by the distance between the outer periphery and the dashed lines in FIG. 5, may be $3/16^{th}$ of an inch.

The body portion 10 and the cap 20 may be made of a transparent material. A translucent or transparent type thermoplastic, thermoset or elastomeric materials can be selected from the following types of polymeric resins: polystyrene, polycarbonate, poly(methyl methacrylate), polyacrylate, polysulphone, poly(ether imide), poly-4-methyl-1-pentene, polyethylene, polyethylene copolymers, poly(vinyl chloride), polypropylene, styrene-acrylonitrile copolymer, polyamides, silicon polymers, polyurethane and/or epoxy.

The interior dispensing mechanism works like a labyrinth and the dog treat product (which typically may be of a shape such as round, pyramidal, square, or oval suitable for travel within the labyrinth) falls out the single specially designed oval hole 18a. The oval opening 18a allows for the random dispersement of treats such that when the device is motioned by a pet, the device randomly disperses pet treats, such as any one of treats 30.

The cylindrical shape with two distinct diameters, i.e. the inner (or outer) diameter of section 14 versus the inner (or outer) diameter of section 18 allows for the body portion 10 to be angled when placed on a flat surface, such as L1 in FIG. 5. This angling allows for continued dispersement of treats and random directionality of toy and treats with pet play. As the apparatus 1 rolls, even with a few food treats or food items 30 in the assembled apparatus 1, the design of the apparatus 1, along with the angle of said apparatus 1 allows for funneling of treats to the oval dispensing hole 18a.

The shape of the toy or apparatus 1 is an attraction that allows for maximum interaction via pushing with pets' noses or paws or picking the toy or apparatus 1 up in their mouths. The apparatus 1 can also be thrown, tossed or rolled. The invention in one or more embodiments is an apparatus and a method for persons to interact with an animal wherein the animal is self-engaged and observed to relate mutually with the apparatus 1 and a reward or treat is dispensed randomly and rewards the animal at a selected rate, depending upon the degree of animal interaction. The invention herein is suitable for use, therefore, with dogs, cats and/or small mammals.

Animals prefer a toy which they can interact with and get rewarded. The use of the apparatus 1 does not require human power therefore the animal has control, of the dispensing of treats.

This apparatus 1 is unique in its at least two diameter cylindrical shape that allows for angling of said apparatus 1 when the apparatus 1 is on a flat surface as shown by FIG. 5. This unique angling allows for movement in random directions as the animal interacts with the apparatus 1. In addition, the angle of said apparatus 1 allows the food items, such as items 30, to be routed toward the oval dispensing hole 18a and thereby minimizes jamming and blockage. The specially designed oval hole 18a allows for a slow and random disbursement of treats. The unique shape is an enticement for animal play. The screw cap 20 is designed for quick and easy filling of the chamber or inside 10b of the apparatus 1.

The apparatus 1 allows a pet to gain positive reinforcement and a reward with a treat for interaction with the apparatus 1, in order to provoke a continued and independent animal interest.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

We claim:

1. An apparatus for dispensing pet food items comprising a cap;
   a body portion comprised of
      a first cylindrical section having a first inner diameter;
      a second cylindrical section having a second inner diameter which is less than the first inner diameter; and
      a transitional section having a gradually decreasing inner diameter wherein the gradually decreasing inner diameter of the transitional section gradually decreases from the first inner diameter to the second inner diameter;

and wherein the transitional section connects the first cylindrical section with the second cylindrical section;

and wherein the cap and the first cylindrical section are adapted so that the cap can be attached to or detached from the first cylindrical section; and wherein the second cylindrical section includes a first end which is connected to the transitional section and a second end which is closed off by an end piece; and and wherein the second cylindrical section includes a periphery through which is located an opening;

and wherein when the cap is attached to the first cylindrical section a chamber is formed inside of a combination of the cap, the first cylindrical section, the transitional section, the second cylindrical section, and the end piece, so that the only exit from the chamber is through the opening.

2. The apparatus of claim 1 wherein the first cylindrical section has a first inner surface;

the second cylindrical section has a second inner surface; and wherein when the cap is attached to the body portion and the apparatus is placed on a flat surface, the first inner surface and the second inner surface slant downwards towards the flat surface.

3. The apparatus of claim 1 wherein the apparatus is made of hard plastic.

4. An apparatus for dispensing pet food items comprising a cap;

a body portion comprised of
   a first cylindrical section having a first inner diameter;
   a second cylindrical section having a second inner diameter which is less than the first inner diameter; and
   a transitional section having a gradually decreasing inner diameter wherein the gradually decreasing inner diameter of the transitional section gradually decreases from the first inner diameter to the second inner diameter;
   and wherein the transitional section connects the first cylindrical section with the second cylindrical section;

and wherein the cap and the first cylindrical section are adapted so that the cap can be attached to or detached from the first cylindrical section; and further comprising a plurality of treats located inside of the body portion.

5. A method of providing a pet food item dispensing device comprising providing a cap;

providing a body portion comprised of
   a first cylindrical section having a first inner diameter;
   a second cylindrical section having a second inner diameter which is less than the first inner diameter; and
   a transitional section having a gradually decreasing inner diameter wherein the gradually decreasing inner diameter of the transitional section gradually decreases from the first inner diameter to the second inner diameter;

further comprising connecting the transitional section to the first cylindrical section with the second cylindrical section;

and wherein the cap and the first cylindrical section are adapted so that the cap can be attached to or detached from the first cylindrical section; and wherein the second cylindrical section includes a first end which is connected to the transitional section and a second end which is closed off by an end piece; and and further comprising providing an opening in a periphery of the second cylindrical section;

and wherein when the cap is attached to the first cylindrical section a chamber is formed inside of a combination of the cap, the first cylindrical section, the transitional section, the second cylindrical section, and the end piece, so that the only exit from the chamber is through the opening.

6. The method of claim 5 wherein the first cylindrical section has a first inner surface;

the second cylindrical section has a second inner surface; and and wherein when the cap is attached to the body portion and the apparatus is placed on a flat surface, the first inner surface and the second inner surface slant downwards towards the flat surface.

7. The method of claim 5 wherein the apparatus is made of hard plastic.

8. A method of providing a pet food item dispensing device comprising providing a cap;

providing a body portion comprised of
   a first cylindrical section having a first inner diameter;
   a second cylindrical section having a second inner diameter which is less than the first inner diameter; and
   a transitional section having a gradually decreasing inner diameter wherein the gradually decreasing inner diameter of the transitional section gradually decreases from the first inner diameter to the second inner diameter;

further comprising connecting the transitional section to the first cylindrical section with the second cylindrical section;

and wherein the cap and the first cylindrical section are adapted so that the cap can be attached to or detached from the first cylindrical section; and further comprising providing a plurality of treats located inside of the body portion.

\* \* \* \* \*